April 24, 1962     K. DEUTSCH     3,031,300

METHOD OF MANUFACTURING CONSUMABLE ELECTRODES

Filed March 25, 1958

INVENTOR
KURT DEUTSCH

BY Cushman, Darby & Cushman
ATTORNEYS

United States Patent Office 3,031,300
Patented Apr. 24, 1962

3,031,300
METHOD OF MANUFACTURING CONSUMABLE ELECTRODES
Kurt Deutsch, Sutton Coldfield, England, assignor to Imperial Chemical Industries Limited, London, England, a corporation of Great Britain
Filed Mar. 25, 1958, Ser. No. 723,677
Claims priority, application Great Britain Mar. 27, 1957
4 Claims. (Cl. 75—208)

This invention is concerned with the melting of metals and alloys, and more particularly an improved electrode for use in the arc melting of high melting point reactive metals such as, for example, titanium, zirconium, thorium, hafnium, molybdenum, and their alloys.

In one method for the continuous arc-melting of such metals and alloys in a cooled crucible, the raw material to be melted is fed to the crucible in the form of a consumable electrode introduced from above, with or without an additional feed of raw material in, for example, sponge or powder or pellet form into the crucible. An arc is struck between this electrode and an initial small charge of the metal in the crucible and subsequently maintained between the electrode and the surface of the molten metal to provide the heat required for progressive melting of the electrode material.

The consumable electrode may be formed from the divided raw material in various ways which depend either upon joining together a plurality of preformed compacts of the material, or upon continuous compacting to give an uninterrupted length of electrode. The former have been in most common use hitherto. One such method is to weld the individual compacts together, but this is time-consuming and has other disadvantages. Another method is to pass a sintering current through a stack of compacts held under pressure, to form a sintered electrode of the requisite length. This has the disadvantage of requiring a relatively high power input in order to effect sufficient sintering for the so-formed electrode to have sufficient strength to be self-supporting.

According to the invention we provide a method of manufacturing a consumable electrode from metal in particulate form in which compacts of the metal having flat end surfaces are assembled together with the adjacent flat end surfaces parallel or substantially parallel and separated from each other by one or more spacers of the metal having a cross-sectional area small compared with that of a compact, and whilst pressure is applied to the outermost end surfaces of the assembled compacts an electrical current is passed from one end to the other, the current being of such a value that the spacers melt so as to join the compacts together upon removal of the current and subsequent solidification of the molten metal and the compacts are at least partially sintered.

By the term "flat surfaces" we mean surfaces which are truly flat, or substantially flat.

According to a feature of the invention the spacers may form part of a compact. The spacers then take the form of small projections on the compact.

The dimensions of the projections will be determined in accordance with the magnitude of the sintering current to be employed. Their number per compact and their location are a matter of choice. Thus, there may be one centrally disposed projection on each compact, but for convenience a plurality of projections, for example, three or four equidistantly spaced, on each compact is to be preferred since they serve to keep the compacts in correct alignment when stacked prior to sintering.

The compacts are stacked in a container for the sintering operation. Electrical contact with the walls of the container must be avoided and, for this purpose, the walls may be provided with insulating material on the inner surfaces of the container. At the upper and lower ends of the container are electrodes for the passage of a current through the stack of compacts and also means for applying pressure to the ends of the stack. The electrode and pressure applying means may conveniently be combined.

The invention is illustrated, but not limited, by the accompanying diagrammatic drawing, in which.

Figure 1:
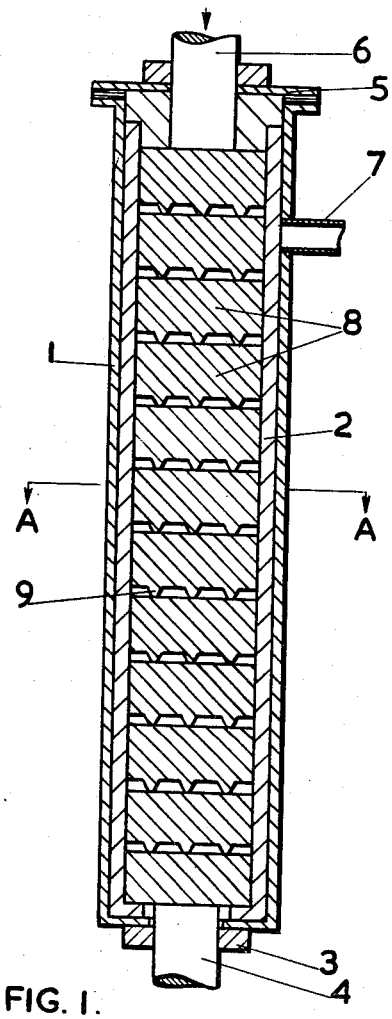
FIGURE 1 represents a vertical section through apparatus for the sintering and bonding of a stack of preformed compacts in accordance with the second stage of one embodiment of the invention.
Figure 2:
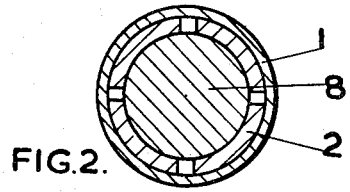
FIGURE 2 is a plan section on the line A—A of FIGURE 1.

Referring to the drawing, a cylindrical metal container 1 is provided with a longitudinally split liner 2 of insulating material with internal diameter slightly larger than the diameter of the preformed compacts to be inserted therein. The base of the container is apertured and fitted with a suitable insulated vacuum gland 3 through which passes a water-cooled electrode 4. The cover 5 makes vacuum-tight connection with the container and carries a second water-cooled electrode 6 adapted for longitudinal movement relative to the container for the purpose of applying pressure to the contents thereof. The electrodes 4 and 6 are connected to a D.C. power source by a conventional circuit (not shown). The container has a further opening 7 which can be connected to a vacuum pump or an inert gas supply.

In operation the cover 5 is removed and the container filled with a stack of titanium powder compacts 8 which have been formed in a suitably shaped compacting die in conventional manner, each having three small projections 9 on one face in contact with the plane face of the adjacent compact. The container is closed, evacuated, argon introduced, and the sintering current passed between the electrodes 4 and 6, a predetermined pressure being maintained upon the contents of the container during passage of the current by means of the adjustable electrode 6. The projections 9 are substantially completely melted and under the applied pressure the partially sintered compacts are welded together to form a self-supporting electrode length which can then be transferred to an arc melting furnace.

We claim:
1. A method of manufacturing a consumable electrode which comprises compacting particles of a high melting point reactive metal into blocks having flat surfaces, assembling said blocks with adjacent flat surfaces substantially parallel and separated from each other by at least one spacer of said metal having a cross-sectional area smaller than said flat surfaces, compressing the assembly substantially perpendicularly to said flat surfaces, and passing an electric current through said assembly while maintaining said assembly under pressure, said current being sufficient to melt said spacers and at least partially sinter the compacted particles of metal.

2. A method as claimed in claim 1 in which at least some of the spacers form part of the compacts.

3. A method as claimed in claim 1 in which the compacts are joined together in an inert atmosphere or in vacuo.

4. A method as claimed in claim 1 wherein the high melting point reactive metal is selected from the group consisting of titanium, zirconium, thorium, hafnium, molybdenum and alloys of these metals.

References Cited in the file of this patent
UNITED STATES PATENTS

| | | |
|---|---|---|
| Re. 22,373 | Benner | Sept. 14, 1943 |
| 2,519,683 | Marien | Aug. 22, 1950 |
| 2,686,822 | Evans et al. | Aug. 17, 1954 |
| 2,703,750 | Cotter | Mar. 8, 1955 |
| 2,725,265 | Daniels et al. | Nov. 29, 1955 |